(12) United States Patent
Morioka et al.

(10) Patent No.: US 8,472,670 B2
(45) Date of Patent: Jun. 25, 2013

(54) TARGET DETECTION DEVICE AND TARGET DETECTION METHOD

(75) Inventors: Mikio Morioka, Kanagawa (JP); Masataka Sugiura, Tokyo (JP)

(73) Assignee: Panasonic Corporation, Osaka (JP)

( * ) Notice: Subject to any disclaimer, the term of this patent is extended or adjusted under 35 U.S.C. 154(b) by 405 days.

(21) Appl. No.: 13/056,188

(22) PCT Filed: May 26, 2009

(86) PCT No.: PCT/JP2009/002315
§ 371 (c)(1), (2), (4) Date: Jan. 27, 2011

(87) PCT Pub. No.: WO2010/016175
PCT Pub. Date: Feb. 11, 2010

(65) Prior Publication Data
US 2011/0216940 A1 Sep. 8, 2011

(30) Foreign Application Priority Data

Aug. 8, 2008 (JP) ................................. 2008-206111

(51) Int. Cl.
*G06K 9/00* (2006.01)
*G06F 17/30* (2006.01)
(52) U.S. Cl.
USPC .......................................... 382/103; 707/769
(58) Field of Classification Search
USPC ................... 382/103–104; 707/769
See application file for complete search history.

(56) References Cited

U.S. PATENT DOCUMENTS
7,843,471 B2 * 11/2010 Doan et al. ................. 345/633
2008/0260213 A1 10/2008 Hatano et al.

FOREIGN PATENT DOCUMENTS
| JP | 2006-098214 | * | 4/2006 |
| JP | 2006-236183 | | 9/2006 |
| JP | 2006-268577 | | 10/2006 |

OTHER PUBLICATIONS

International Search Report in PCT/JP2009/002315, mailed on Sep. 1, 2009.

* cited by examiner

*Primary Examiner* — Amara Abdi
(74) *Attorney, Agent, or Firm* — Greenblum & Bernstein, P.L.C.

(57) ABSTRACT

Disclosed is a target detection device which can match a moving object in a captured image to an identifier when a plurality of identifiers began to be received in a short time, or when the number of identifiers received was larger than the number of detected position histories. The device (100) comprises: a feature information extraction unit (103) which extracts the feature information of at least one moving object imaged in a captured image, a read unit (104) which reads the identifier of the wireless terminal held by the moving object, a history controller (105) which links and saves the feature information and the identifier at each time, and a matching unit (106) which matches the feature information and an identifier stored in the history controller (105) based on the degree of similarity with the feature information stored in the history controller (105) and the links between the feature information and the identifier.

14 Claims, 20 Drawing Sheets

| TIME | CHARACTERISTIC INFORMATION | IDENTIFIER |
|---|---|---|
| t1 | (100,10)<br>(15,150) | ID11<br>ID22 |
| t2 | (95,15)<br>(80,90) | ID22<br>ID33 |
| ... | ... | ... |

FIG.6

| TIME | CHARACTERISTIC INFORMATION | IDENTIFIER |
|---|---|---|
| t1 | ((100,10),(300,400)) ((15,150),(600,450)) | ID11 ID22 |
| t2 | ((95,15),(200,300)) ((80,90),(550,100)) | ID22 ID33 |
| ... | ... | ... |

FIG.9

| TIME | CHARACTERISTIC INFORMATION | IDENTIFIER |
|---|---|---|
| t1 | (100,10) | ID22 |
| t1 | (15,150) | ID11 |
| t2 | (95,15) | ID22 |
| t2 | (80,90) | ID33 |
| ... | ... | ... |

FIG.13

| TIME | CHARACTERISTIC INFORMATION | IDENTIFIER | PHOTOGRAPHING CAMERA ID | WHITE BALANCE |
|---|---|---|---|---|
| t1 | (100,10) (15,150) | ID11 ID22 | CID3 | +3 |
| t2 | (95,15) (80,90) | ID22 ID33 | CID4 | −2 |
| ... | ... | ... | ... | ... |

FIG.19

TARGET DETECTION DEVICE AND TARGET DETECTION METHOD

TECHNICAL FIELD

The present invention relates to an object detection apparatus and object detection method that mutually associate a moving object such as a person detected in a photographic image and a radio terminal identifier.

BACKGROUND ART

Heretofore, the technology disclosed in Patent Literature 1 has been known as a technology whereby a moving object such as a person photographed in an open space or the like with no clearly defined entrance and no entrance/exit gate is associated with an identifier of a radio terminal held by that moving object.

In a conventional moving object detection system, if the difference between a moving object position detection start time and a radio terminal identifier reception start time is within a predetermined time, a moving object position history (hereinafter referred to for convenience as "position history") and radio terminal identifier (hereinafter referred to for convenience as "identifier") are mutually associated. A position history is a history of a position of a moving object captured by a camera or the like and a detection start time thereof.

Furthermore, in a conventional moving object detection system, if a plurality of position histories exist in which detection was started within a predetermined time after an identifier reception start time, the position history for which the detection start time is closest to the identifier reception start time is associated with the identifier.

For example, assume that a conventional moving object detection system acquires two position histories P1 and P2 and one identifier ID1 as shown in FIG. 1. In this case, in a conventional moving object detection system, differences $|T_{P1}-T_{ID1}|$ and $|T_{P2}-T_{ID1}|$ between respective position history detection start times $T_{P1}$ and $T_{P2}$ and identifier reception start time $T_{ID1}$ are calculated. In the example shown in FIG. 1, $|T_{P1}-T_{ID1}|>|T_{P2}-T_{ID1}|$, and therefore, in a conventional moving object detection system, position history P2 is associated with identifier T1.

CITATION LIST

Patent Literature

PTL 1
Japanese Patent Application Laid-Open No. 2006-98214

SUMMARY OF INVENTION

Technical Problem

However, since a conventional moving object detection system performs association based on only time differences, it cannot perform association correctly in cases (1) and (2) below.

(1) When Reception is Started for a Plurality of Identifiers in a Short Time

When a plurality of moving objects move while keeping close to each other, the detection start times of the moving objects and the reception start times of identifiers of radio terminals held by the moving objects will be virtually the same (within a margin of error).

For example, consider a case in which two moving objects A and B move while keeping close to each other. As shown in FIG. 2, detection start times $T_{P1}$ and $T_{P2}$ of two position histories P1 and P2, and reception start times $T_{ID1}$ and $T_{ID2}$ of two identifiers ID1 and ID2, respectively, are virtually the same. When there are a plurality of identifiers whose reception start times are the same in this way, a position history cannot be associated with an identifier in a conventional moving object detection system.

(2) When a Number of Received Identifiers is Greater than a Number of Detected Position Histories It may be, for example, that a moving object position detection range is different from an identifier reception range. Consequently, it may happen, for example, that of two moving objects A and B, moving object A moves through an area that is outside the position detection range but is within the identifier reception range, while moving object B moves through an area that is within both the position detection range and the identifier reception range.

In this case, one position history P1 and two identifiers ID1 and ID2 are acquired, as shown in FIG. 3. With a conventional moving object detection system, association cannot be performed at either of reception start times $T_{ID1}$ and $T_{ID2}$ of the two identifiers ID1 and ID2. The reason for this is that, since detection start time $T_{P1}$ of position history P1 is closest, which of the identifiers position history P1 should be associated with cannot be determined.

Thus, with conventional technology, there is a problem of not being able to perform association of an identifier with a moving object in a photographic image when reception is started for a plurality of identifiers in a short time, or when a number of received identifiers is greater than a number of detected position histories.

It is an object of the present invention to provide an object detection apparatus and object detection method that enable association of an identifier with a moving object in a photographic image to be performed even if reception is started for a plurality of identifiers in a short time, or if a number of received identifiers is greater than a number of detected position histories.

Solution to Problem

An object detection apparatus according to the present invention employs a configuration having: a characteristic information extraction section that extracts characteristic information of at least one moving object shown in a photographic image; a reading section that reads an identifier of a radio terminal held by the moving object; a history management section that stores the characteristic information and the identifier associated on a time-by-time basis; and an association section that mutually associates the characteristic information and the identifier stored in the history management section based on similarity of the characteristic information and the association between the characteristic information and the identifier.

An object detection method according to the present invention has: a characteristic information extraction step of extracting characteristic information of at least one moving object shown in a photographic image; a reading step of reading an identifier of a radio terminal held by the moving object; a history management step of storing in memory the characteristic information and the identifier associated on a time-by-time basis; and an association step of mutually associating the characteristic information and the identifier stored in the memory based on similarity of the characteristic information stored in the memory and the association between the characteristic information and the identifier.

Advantageous Effects of Invention

According to the present invention, by finding an identifier corresponding to characteristic information based on similarity of characteristic information, mutual association of a moving object in a photographic image and an identifier can easily be performed even if reception is started for a plurality of identifiers in a short time, or if a number of received identifiers is greater than a number of detected position histories.

BRIEF DESCRIPTION OF DRAWINGS

FIG. 6 is a drawing showing an example of history information managed by a history management section according to Embodiment 1 of the present invention;

FIG. 9 is a drawing showing an example of history information managed by a history management section according to Embodiment 1 of the present invention;

FIG. 13 is a drawing showing an example of history information managed by a history management section according to Embodiment 1 of the present invention;

FIG. 19 is a drawing showing a system configuration including an object detection apparatus according to Embodiment 3 of the present invention.

DESCRIPTION OF EMBODIMENTS

Now, embodiments of the present invention will be described in detail with reference to the accompanying drawings. In the embodiments, cases in which a moving object is a person will be described. Also, each person has a radio terminal capable of transmission of a unique identifier by radio. A radio terminal is an RFID (Radio Frequency Identification) tag, contactless IC card, wireless tag, Bluetooth (registered trademark) terminal, wireless LAN (local area network) terminal, millimeter wave tag, or the like.

Embodiment 1

Figure 1:
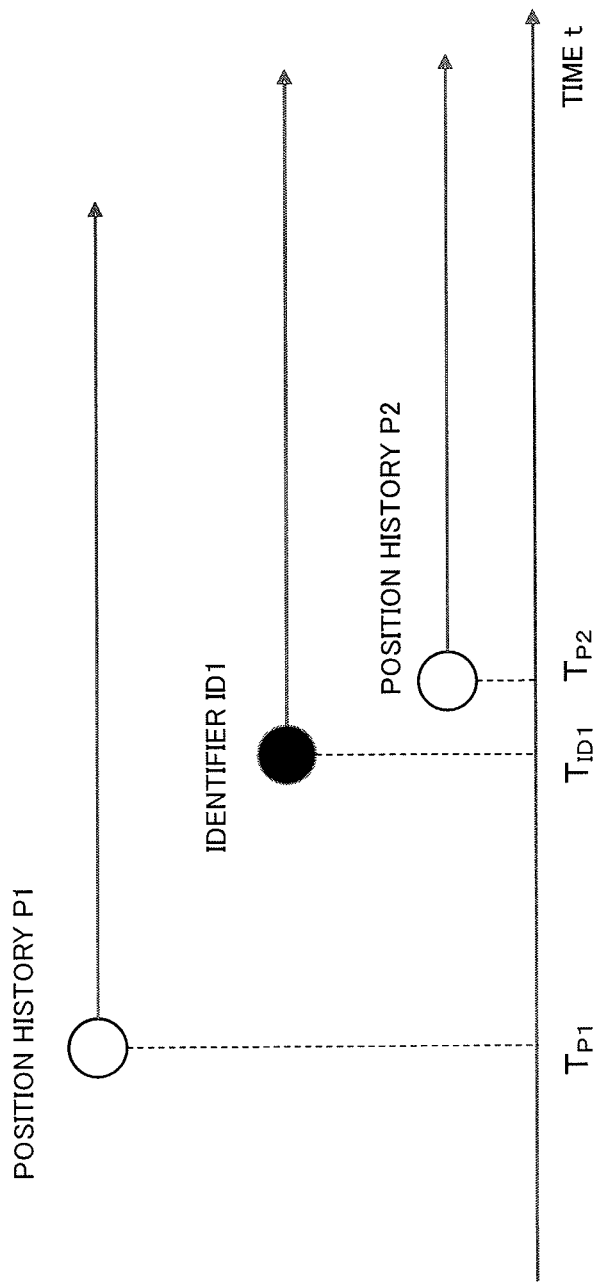
FIG. 1 is a drawing explaining association of an identifier with a position history according to conventional technology.
Figure 2:
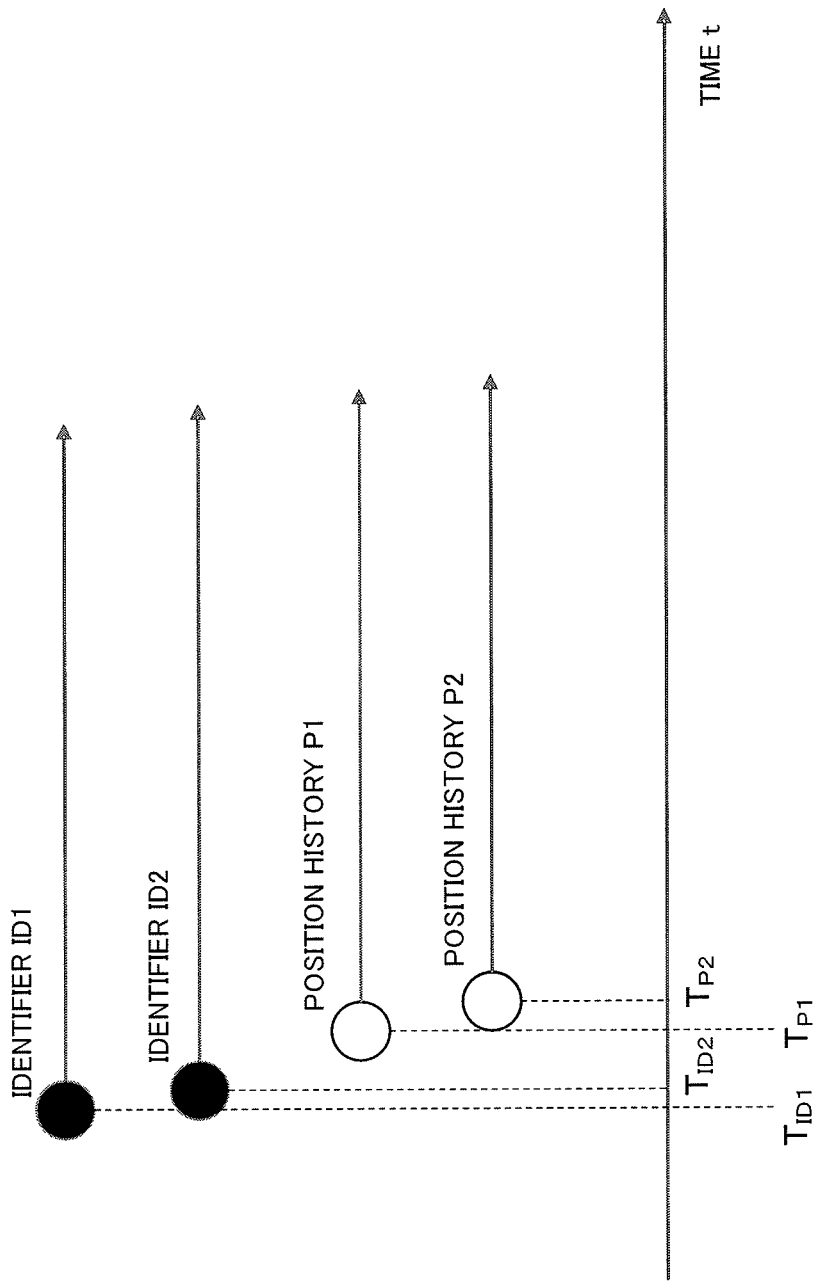
FIG. 2 is a drawing explaining a problem with conventional technology.
Figure 3:
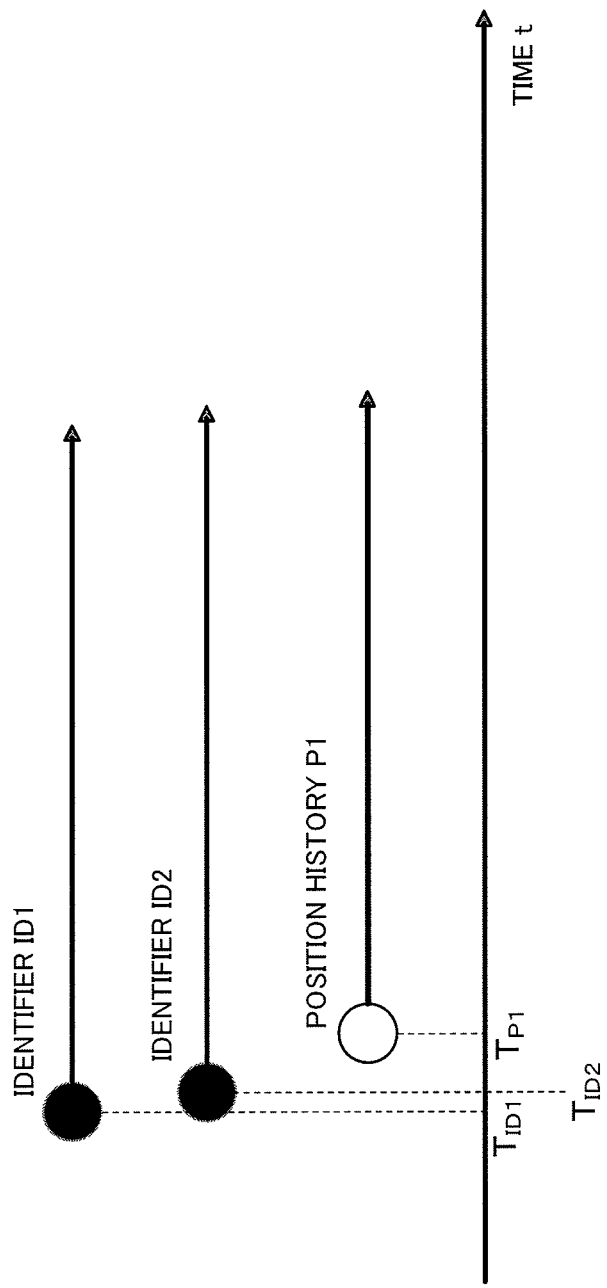
FIG. 3 is a drawing explaining a problem with conventional technology.
Figure 4:
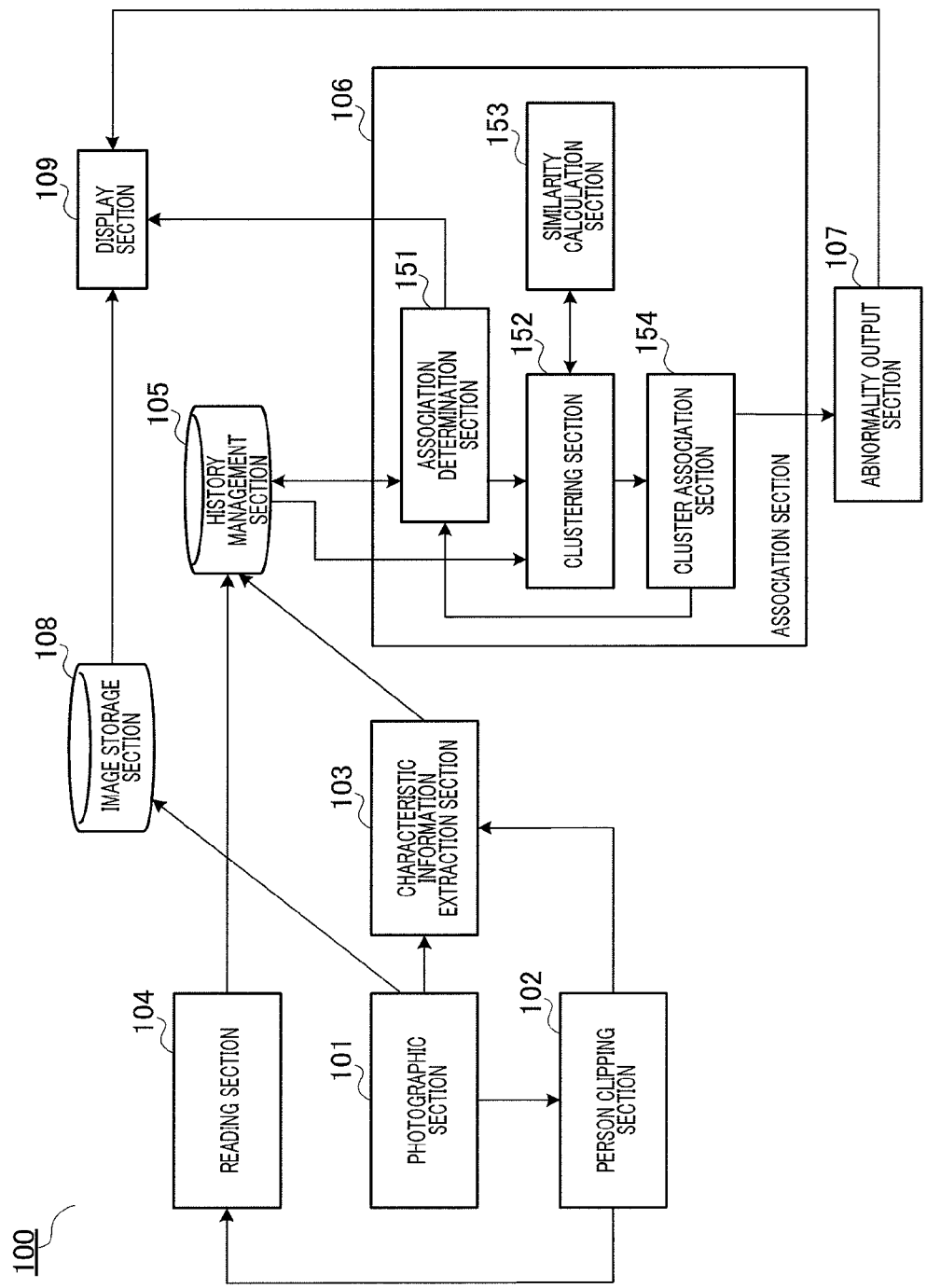
FIG. 4 is a block diagram showing the configuration of an object detection apparatus according to Embodiment 1 of the present invention.
Figure 5:
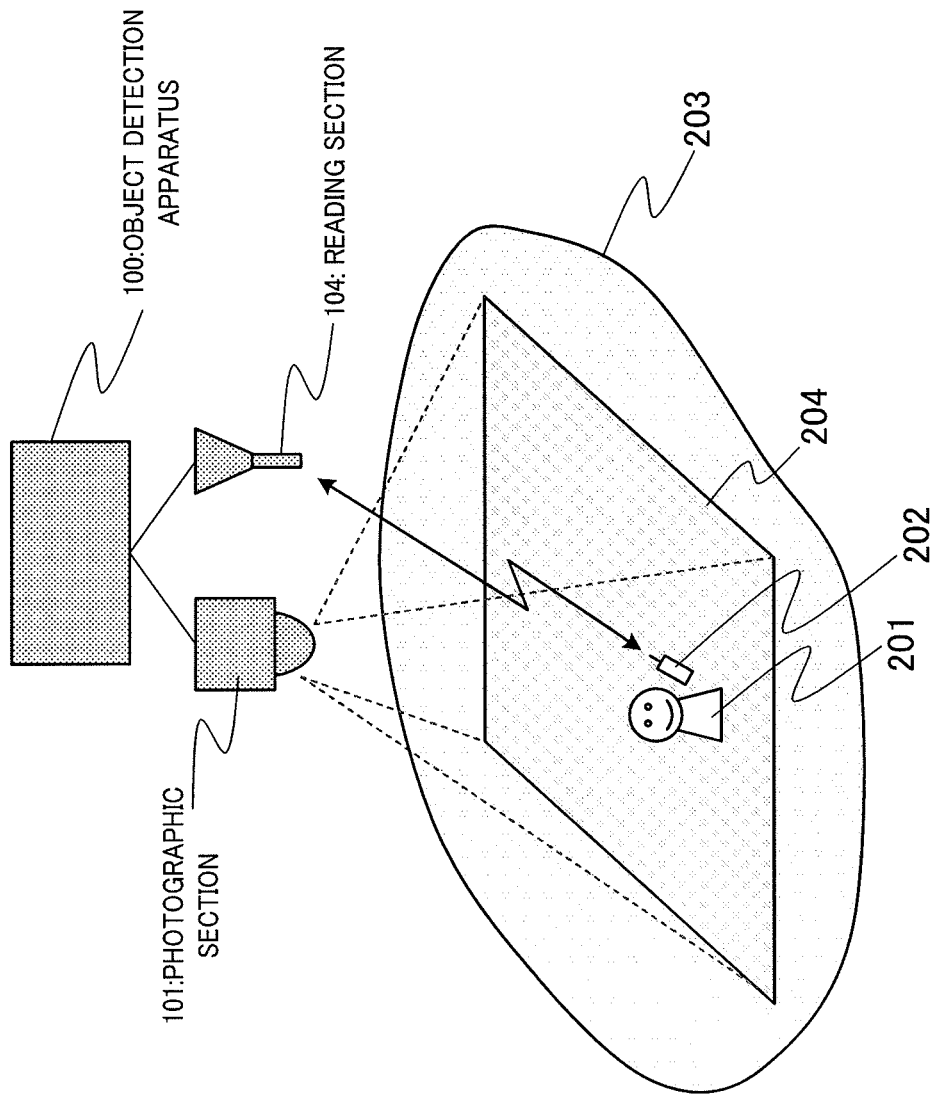
FIG. 5 is a drawing showing a system configuration including an object detection apparatus according to Embodiment 1 of the present invention.

FIG. 4 is a block diagram showing the configuration of an object detection apparatus according to Embodiment 1 of the present invention, and FIG. 5 is a drawing showing a system configuration including an object detection apparatus according to Embodiment 1 of the present invention.

Object detection apparatus 100 is mainly composed of photographic section 101, person clipping section 102, characteristic information extraction section 103, reading section 104, history management section 105, association section 106, abnormality output section 107, image storage section 108, and display section 109. Association section 106 has association determination section 151, clustering section 152, similarity calculation section 153, and cluster association section 154.

Photographic section 101 photographs a predetermined area using a camera, and outputs a photographic image to person clipping section 102, characteristic information extraction section 103, and image storage section 108.

Person clipping section 102 detects an area in which person 201 is shown (hereinafter referred to as "person area") from a photographic image output from photographic section 101 at predetermined timing. Then, if a number of persons 201 shown in the photographic image increases or decreases, person clipping section 102 reports information indicating this fact to reading section 104. Person clipping section 102 also outputs a position of a person area to characteristic information extraction section 103. Person area detection is implemented by using an existing method. For example, person clipping section 102 detects a person area based on a difference between image information of a past frame (background information) and image information of a present frame using input photographic images.

Characteristic information extraction section 103 references information output from person clipping section 102, extracts all characteristic information of person 201 shown in a photographic image output from photographic section 101, and outputs the extracted characteristic information to history management section 105. Characteristic information is represented, for example, as N-dimensional data using a color characteristic amount, brightness gradient characteristic amount, and so forth. Generally, in the image recognition field, principal component analysis is executed on a characteristic vector composed of several hundred dimensions, and a vector reduced to around a hundred dimensions is used as characteristic information. However, in this embodiment, a characteristic vector is described as being 2-dimensional (comprising a first principal component and second principal component obtained by principal component analysis of an N-dimensional vector, for example). Characteristic information is, for example, characteristic information indicating a characteristic of a person's face, or characteristic information indicating a characteristic of a person's shape.

Reading section 104 has a receiving antenna, and receives a radio wave transmitted from radio terminal 202 held by person 201 at the timing of a report from person clipping section 102. As explained above, a report from person clipping section 102 is a report of information indicating that a number of persons 201 shown in a photographic image has increased or decreased. At this time, reading section 104 may receive a report from person clipping section 102 and issue an inquiry regarding an identifier to radio terminal 202. Specifically, provision can be made for reading section 104 to transmit an inquiry signal to radio terminal 202, and for radio terminal 202 to receive a radio wave transmitted by radio terminal 202 in response to that inquiry, and read an identifier superimposed on the received radio wave. Reading section 104 outputs all acquired identifiers to history management section 105. As shown in FIG. 5, for example, reception range 203 of reading section 104 is set equal to or wider than photographic range 204 of photographic section 101.

History management section 105 has characteristic information extracted by characteristic information extraction section 103 and an identifier read by reading section 104 as input, mutually associates characteristic information and an identifier on a time-by-time basis, and manages these as history information.

Association section 106 performs mutual association of characteristic information and an identifier managed as history information by history management section 105. Then association section 106 outputs information indicating an association result to display section 109.

If association section 106 determines that there is an abnormality, abnormality output section 107 outputs information indicating that result to display section 109.

Image storage section 108 stores a photographic image output from photographic section 101, with time information attached. Display section 109 displays a photographic image stored in image storage section 108, with an identifier corresponding to characteristic information of a person shown in the photographic image superimposed. If information indicating an abnormality is input from abnormality output section 107, display section 109 may display information indicating this abnormality superimposed on the photographic image.

Association determination section 151 determines whether or not characteristic information and an identifier of history information can be mutually associated on a one-to-one basis.

Specifically, if there is one each of a number of items of characteristic information and a number of identifiers of history information at a predetermined time, association determination section 151 mutually associates characteristic information and identifiers on a one-to-one basis. On the other hand, if at least one of a number of items of characteristic information and a number of identifiers of history information is a plurality at a predetermined time, association determination section 151 determines that characteristic information and identifiers cannot be mutually associated on a one-to-one basis. Furthermore, association determination section 151 issues a trigger for performing clustering processing to clustering section 152. If association of target characteristic information has been established in past clustering processing (processing that performs classification into subsets), association determination section 151 may mutually associate characteristic information and identifiers on a one-to-one basis using the result of that processing.

Also, if a cluster and identifier have been mutually associated on a one-to-one basis by cluster association section 154, association determination section 151 mutually associates characteristic information and an identifier based on that result.

Then association determination section 151 outputs information indicating an association result to display section 109.

On receiving a trigger from association determination section 151, clustering section 152 takes characteristic information of history information managed by history management section 105 as input, and clusters the characteristic information based on similarity. The actual processing performed by clustering section 152 will be described later herein.

When clustering is performed by clustering section 152, similarity calculation section 153 calculates the similarity of characteristic information. In this embodiment, inter-vector distance is used as similarity. In this embodiment, there are no restrictions on the method of calculating similarity.

Cluster association section 154 performs mutual association of a cluster generated by clustering section 152 and an identifier. Then, when a cluster and identifier have been mutually associated on a one-to-one basis, cluster association section 154 outputs information indicating that result to association determination section 151. On the other hand, when a cluster and identifier cannot be mutually associated on a one-to-one basis, cluster association section 154 outputs information indicating that result to abnormality output section 107.

Next, processing whereby association section 106 performs mutual association of characteristic information and an identifier managed by history management section 105 will be described in detail using the example in FIG. 6. FIG. 6 is a drawing showing an example of history information managed by history management section 105.

In this example, it is assumed that two persons are detected at time t1, the characteristic information of these persons is (100,10) and (15,150) respectively, and the radio terminal identifiers detected at that time are ID11 and ID22. It is also assumed that two persons are detected at time t2, the characteristic information of these persons is (95,15) and (80,90) respectively, and the radio terminal identifiers detected at that time are ID22 and ID33.

Figure 7:
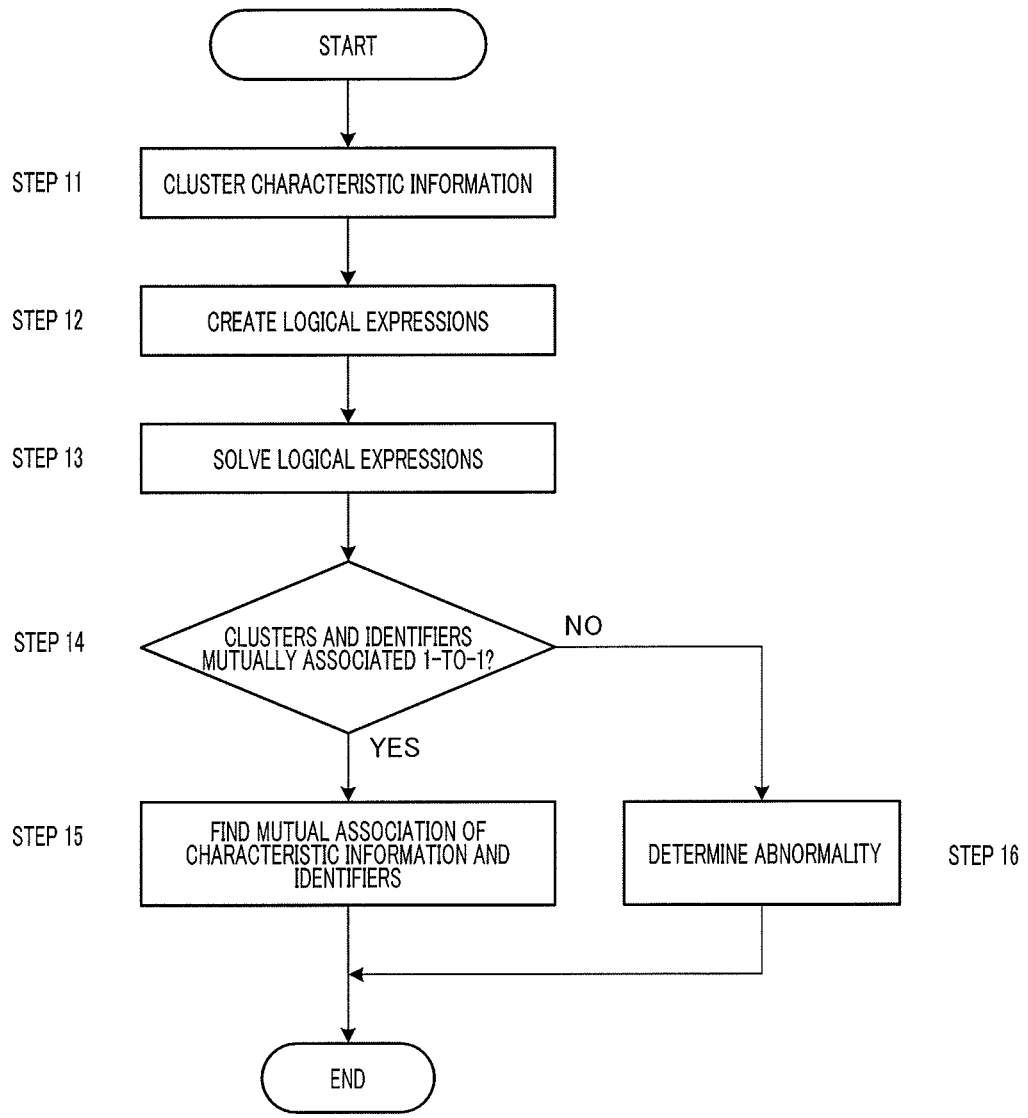
FIG. 7 is a flowchart showing the operating procedure of an association section according to Embodiment 1 of the present invention.

If characteristic information and identifiers of a plurality of persons are detected at the same time, characteristic information and identifiers cannot be mutually associated with history information alone at that time. Therefore, in the case of FIG. 6, association section 106 performs mutual association of characteristic information and identifiers in accordance with the operating procedure shown in FIG. 7, using both time t1 and time t2 history information. FIG. 7 is a flowchart showing the operating procedure of association section 106 according to this embodiment.

Step 11: Cluster Characteristic Information.

Clustering section 152 clusters characteristic information for which an inter-vector distance calculated by similarity calculation section 153 is shorter than a predetermined threshold value so as to be classified in the same cluster. In this embodiment, a method is used whereby items of characteristic information at a distance less than or equal to a predetermined threshold value are classified as one cluster, but in the present invention the clustering method is not limited to this. Other known clustering methods are a hierarchical method such as a shortest distance method, and a partitioning optimization method such as a k-means method.

Figure 8:
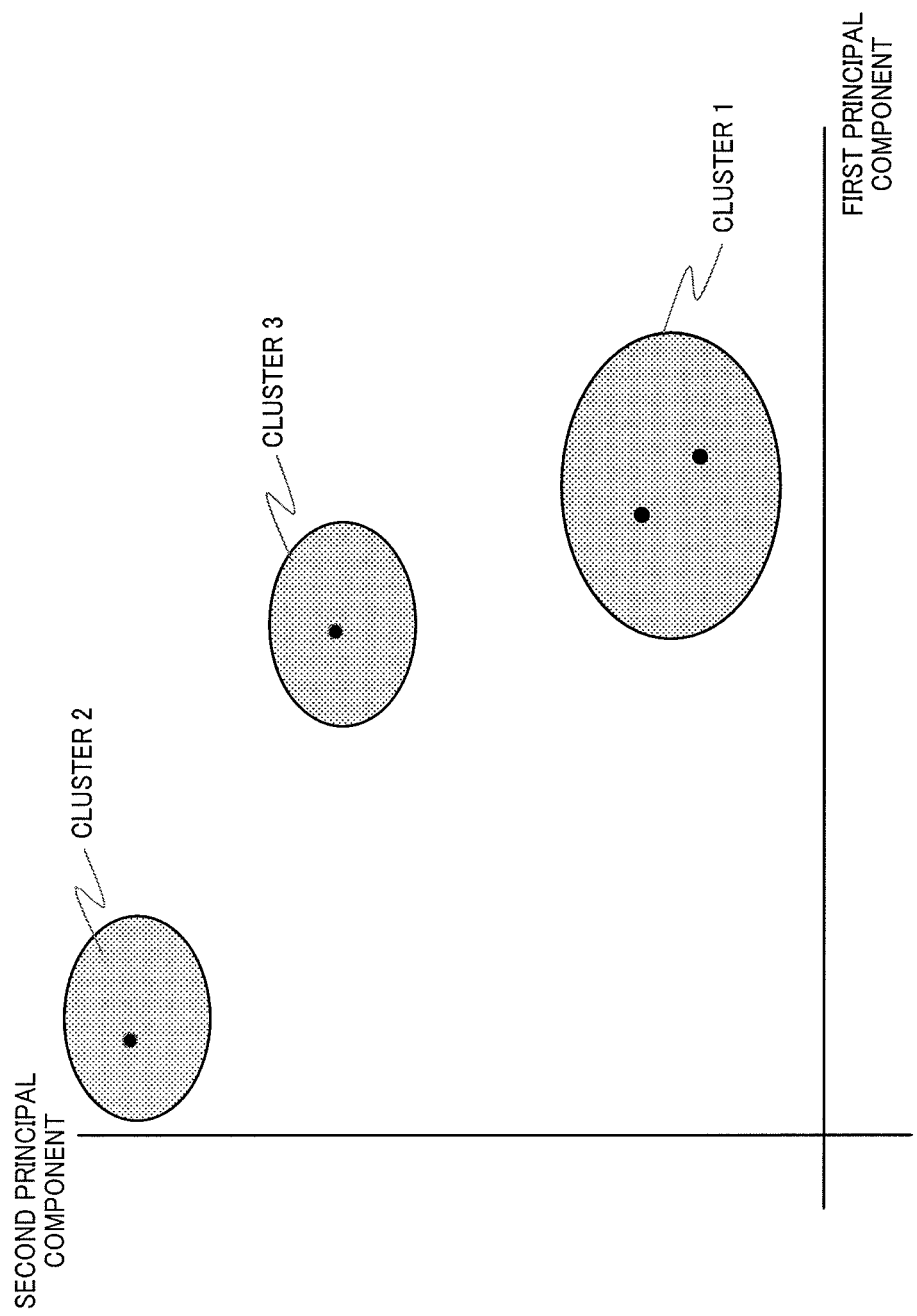
FIG. 8 is a drawing explaining clustering according to Embodiment 1 of the present invention.

In this example, as shown in FIG. 8, the inter-vector distance of characteristic information (100,10) at time t1 and characteristic information (95,15) at time t2 is shorter than a predetermined threshold value. Therefore, clustering section 152 classifies these items of characteristic information into cluster 1. Also, clustering section 152 classifies characteristic information (15,150) at time t1 into cluster 2, and classifies characteristic information (80,90) at time t2 into cluster 3.

Step 12: Create Logical Expressions.

Taking a cluster as a variable, cluster association section 154 creates logical expressions representing association conditions between each cluster and an identifier at each time.

In this example, cluster association section 154 creates expression 1 through expression 4 below.

Characteristic information (100,10) at time t1 belongs to cluster 1, with ID11 and ID22 being possibilities. This can be represented by expression 1 below.

$$\text{Cluster 1}=\{ID11,ID22\} \quad \text{(Expression 1)}$$

Characteristic information (15,150) at time t1 belongs to cluster 2, with ID11 and ID22 being possibilities. This can be represented by expression 2 below.

$$\text{Cluster 2}=\{ID11,ID22\} \quad \text{(Expression 2)}$$

Similarly, characteristic information (95,15) at time t2 belongs to cluster 1, with ID22 and ID33 being possibilities, and characteristic information (80,90) belongs to cluster 3, with ID22 and ID33 being possibilities. This can be represented by expressions 3 and 4 below.

$$\text{Cluster 1}=\{ID22,ID33\} \quad \text{(Expression 3)}$$

$$\text{Cluster 3}=\{ID22,ID33\} \quad \text{(Expression 4)}$$

Step 13: Solve the Logical Expressions.

Cluster association section 154 solves the logical expressions created in step 12, using logical expression transformation. In the present invention, there are no restrictions on the method of solving logical expressions. Known methods of solving logical expressions include a constraint satisfaction problem solution method (such as a backtracking method), an approximation algorithm, a full search, and so forth.

In this example, cluster association section 154 finds an identifier corresponding to each cluster by solving above expression 1 through expression 4. First, from expression 1 and expression 3, a possible cluster 1 identifier is limited to ID22. This can be represented by expression 5 below.

$$\text{Cluster 1}=\{ID22\} \quad \text{(Expression 5)}$$

Next, from expression 2 and expression 5, a possible cluster 2 identifier is limited to ID11. Also, from expression 4 and expression 5, a possible cluster 3 identifier is limited to ID33.

Step 14: Mutually Associate Clusters and Identifiers.

Cluster association section 154 performs mutual association of clusters and identifiers based on the results of solving the logical expressions.

In this example, as explained in step 13, possible identifiers of each cluster are limited to one, and therefore clusters and identifiers are mutually associated on a one-to-one basis (step 14: YES).

On the other hand, if a person who does not have a radio terminal enters the photographic range, or if radio terminals are exchanged, logical expressions created from history information will conflict. In such a case, identifiers are not associated with clusters when logical expressions are solved (step 14: NO).

Step 15: Mutually Associate Characteristic Information and Identifiers.

If clusters and identifiers have been mutually associated on a one-to-one basis in step 14 (step 14: YES), association determination section 151 associates an identifier with characteristic information based on a correspondence relationship between clusters and identifiers. Furthermore, association determination section 151 outputs information indicating association results to display section 109.

In this example, from the results of step 13, cluster association section 154 associates ID22 with characteristic information (100,10) and characteristic information (95,15) belonging to cluster 1. Furthermore, cluster association section 154 associates ID11 with characteristic information (15, 150) belonging to cluster 2, and associates ID33 with characteristic information (80,90) belonging to cluster 3.

Step 16: Perform Abnormality Occurrence Processing.

If identifiers have not been associated with clusters in step 14 (step 14: NO), abnormality output section 107 determines that there is an abnormality, and outputs the determination result to display section 109. By this means, an abnormality comprising non-possession or exchanging of a radio terminal can be detected.

Next, a method for performing display for specific characteristic information will be described.

When characteristic information extraction section 103 extracts characteristic information of a human object from a photographic image, in addition to a characteristic vector, characteristic information extraction section 103 also extracts the position of an object within an image. Then characteristic information extraction section 103 records a characteristic vector and object position in history management section 105. FIG. 9 is a drawing showing an example of history information including intra-image object position information.

In the example in FIG. 9, it is shown that two objects with characteristic information ((100,10), (300,400)) and characteristic information ((100,10), (300,400)), were detected from a photographic image at time t1. The meaning of characteristic information ((100,10), (300,400)) is that (100,10) is a characteristic vector of an object, and (300,400) is a position of an object within an image.

Display section 109 performs the following processing when performing display for specific characteristic information.

(1) Display section 109 acquires an image of a time corresponding to characteristic information.

(2) Display section 109 displays an image acquired from image storage section 108, superimposed on position coordinate information of an object acquired from characteristic information.

Figure 10:
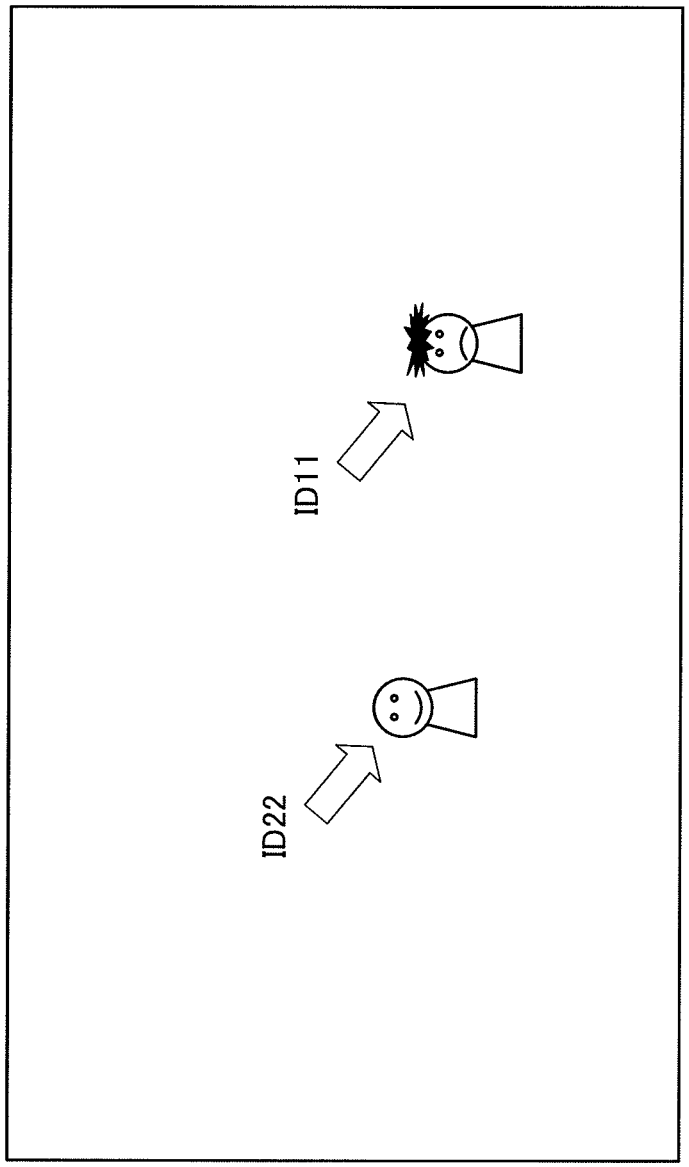
FIG. 10 is a drawing showing an example of a display image according to Embodiment 1 of the present invention.

FIG. 10 is a drawing showing an example of a display image displayed with identifiers superimposed on a photographic image of time t1 in FIG. 6. Using results found by association section 106, display section 109 performs display on the periphery of a person area captured within a photographic image such that an identifier of a radio terminal held by that person is known. In the example in FIG. 10, display section 109 displays "ID11" and an arrow on the periphery of a person area corresponding to characteristic information (15,150), and displays "ID22" and an arrow on the periphery of a person area corresponding to characteristic information (100,10).

As described above, according to this embodiment, characteristic information is clustered, and an identifier corresponding to each cluster is found. By this means, mutual association of a moving object and an identifier can be performed easily even if reception is started for a plurality of identifiers in a short time, or if a number of received identifiers is greater than a number of detected position histories.

Also, a problem with conventional technology is that a radio terminal must constantly transmit a radio wave in order for a position history to be ascertained, resulting in high power consumption. However, with this embodiment, reading section 104 need only perform communication with radio terminal 202 when person clipping section 102 detects an increase in the number of persons shown in a photographic image, and therefore it is not necessary for radio terminal 202 to constantly transmit a radio wave. Consequently, radio terminal 202 does not normally perform communication with reading section 104, but is activated on receiving a radio wave from reading section 104. Therefore, it is possible to use a semi-passive radio terminal (semi-passive tag) that superimposes an identifier on a radio wave using its own power after activation as radio terminal 202. Alternatively, it is possible to use a passive radio terminal (passive tag) that superimposes an identifier on a radio wave that reflects part of a radio wave from reading section 104 as radio terminal 202. By such means, radio terminal power consumption can be kept lower than in the case of conventional technology.

Figure 11:
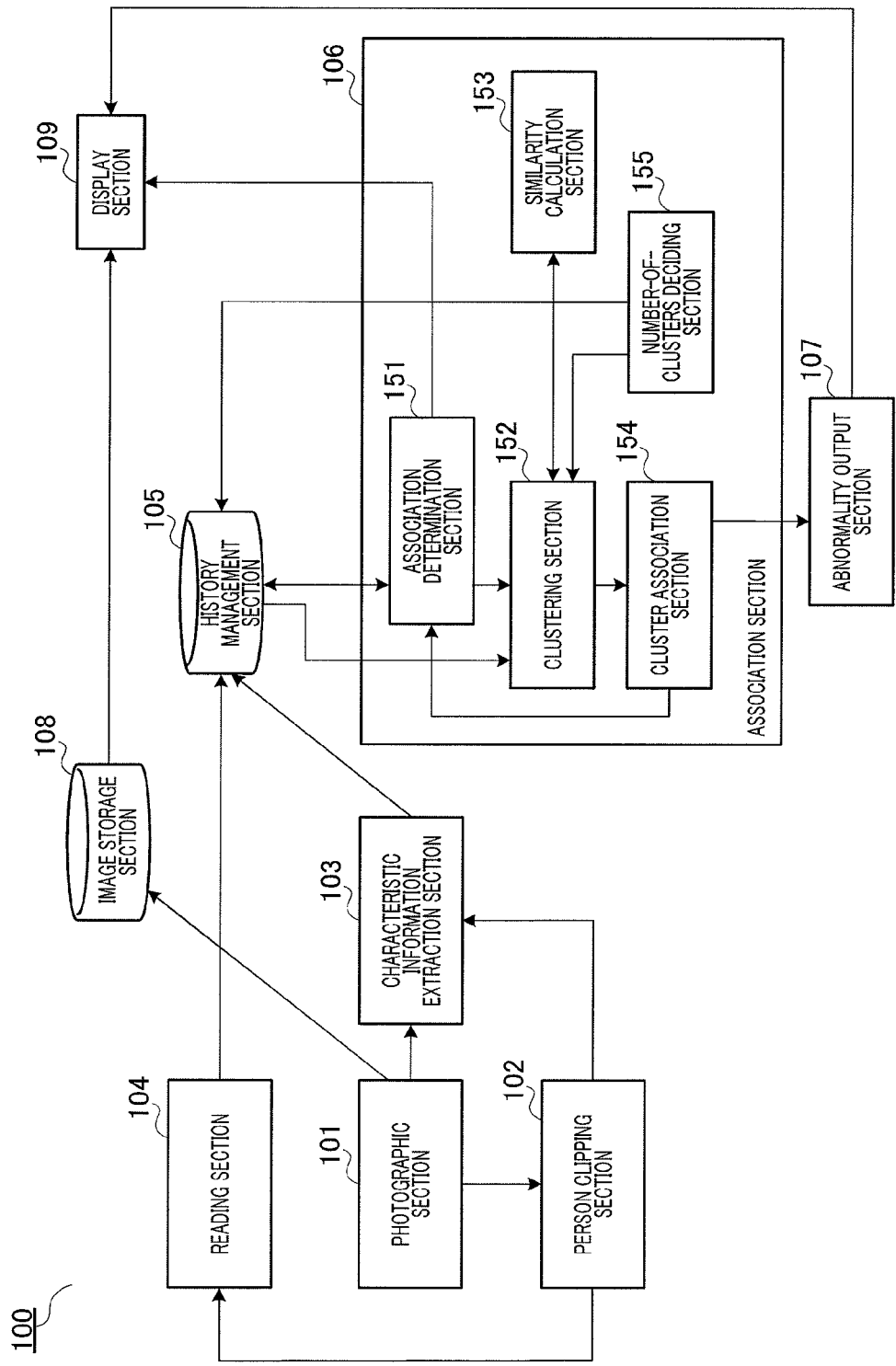
FIG. 11 is a block diagram showing the configuration of an object detection apparatus according to Embodiment 1 of the present invention.

In this embodiment, association section 106 may also employ a configuration having number-of-clusters deciding section 155 inside association section 106, as shown in FIG. 11. Number-of-clusters deciding section 155 finds the total number of identifiers of history information managed by history management section 105, and outputs the result to clustering section 152 as a maximum number of clusters. In the example in FIG. 6, there are three identifiers—ID11, ID22, and ID33—and therefore the maximum number of clusters is set as "3". If only a period corresponding to part of the history information managed by history management section 105 is made a target of clustering, number-of-clusters deciding section 155 may find the total number of clusters detected in that period, and output the found total to clustering section 152 as the maximum number of clusters.

In this case, clustering section 152 sets an upper limit of the number of clusters to the maximum number of clusters when clustering is performed in step 11 in FIG. 7. By this means, it is possible to reduce the search range in clustering processing, and the amount of clustering calculation can be reduced and clustering precision improved.

Figure 12:
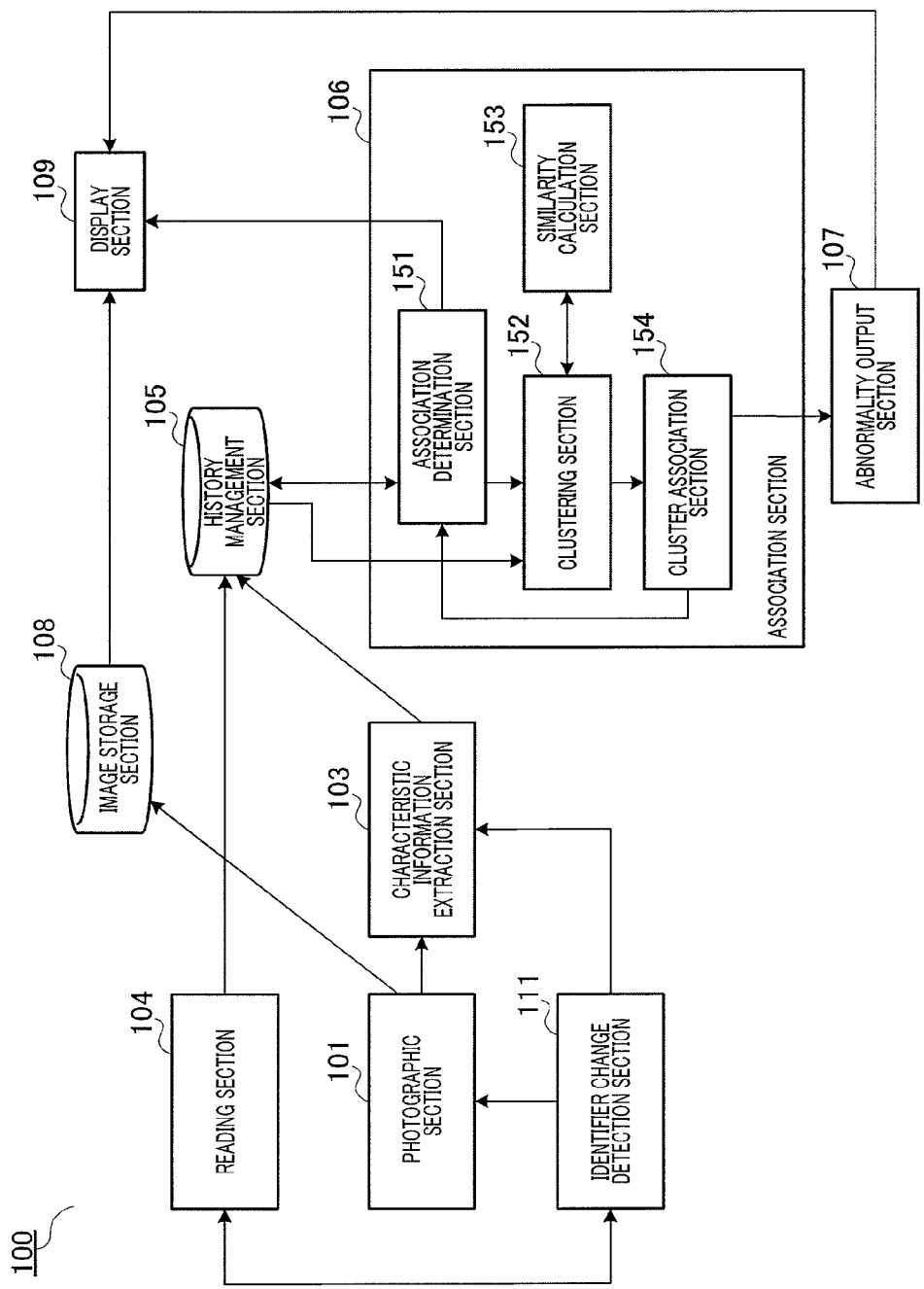
FIG. 12 is a block diagram showing the configuration of an object detection apparatus according to Embodiment 1 of the present invention.

Provision may also be made for identifier change detection section 111 to be used instead of person clipping section 102, as shown in FIG. 12. Identifier change detection section 111 monitors reading section 104 reading results, and when the number of identifiers increases or decreases, issues a directive to characteristic information extraction section 103 and reading section 104 to record characteristic information and identifiers in history management section 105. If photographic section 101 is not constantly performing photography at this time, identifier change detection section 111 also issues a directive to start photography to photographic section 101. Identifier change detection section 111 outputs a directive to start photography prior to issuing a directive to characteristic information extraction section 103.

Also, in this embodiment, association section 106 may output an association result to history management section 105 as association information, and manage association information. By this means, when performing association from the second time onward, association section 106 can reduce the amount of clustering and association calculation by utilizing association information. This case is described below.

FIG. 13 is a drawing showing an example of history data managed by history management section 105. In this example, this is data in which results of association performed by association section 106 are reflected. The first line of the data table shows that characteristic information (100, 10) is associated with ID22. Similarly, the data table shows that characteristic information (15,150) is associated with ID11, characteristic information (95,15) with ID22, and characteristic information (80,90) with ID33.

Thus, when a request is made to find an identifier corresponding to characteristic information (100,10) at time t1, for example, association determination section 151 already knows that characteristic information (100,10) at time t1 is associated with ID22. Consequently, an association result indicating that the identifier is ID22 can be issued without performing clustering section 152 and subsequent processing.

Also, in clustering section 152 and subsequent processing, logical expressions are simplified, enabling the amount of calculation to be reduced.

In this embodiment, a case has been described in which association determination section 151 first determines whether or not characteristic information and an identifier can be mutually associated at a single time. However, the present invention is not limited to this, and provision may also be made for association determination section 151 to be eliminated from FIG. 4, and for clustering to be performed in all cases.

Embodiment 2

Figure 14:
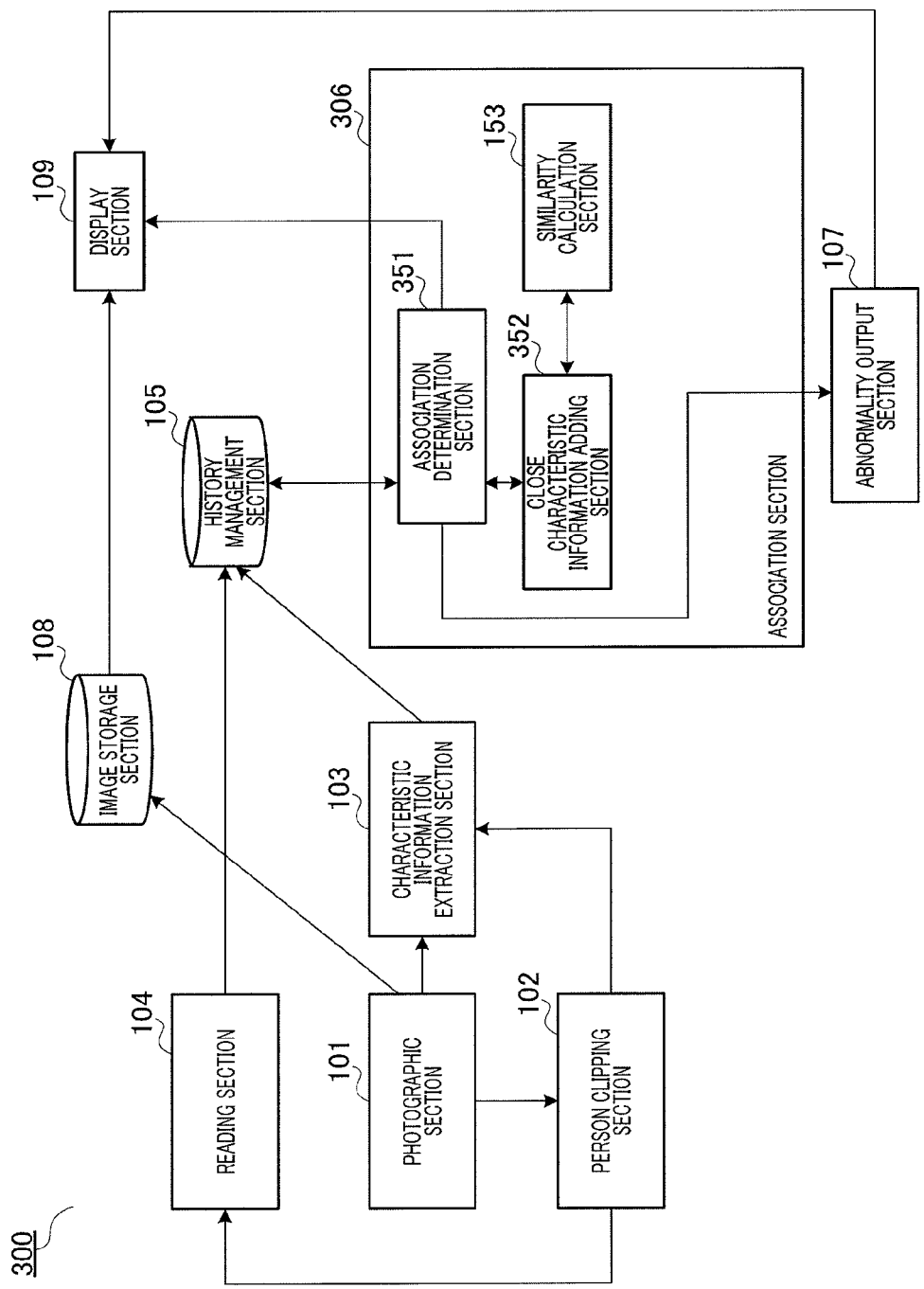
FIG. 14 is a block diagram showing the configuration of an object detection apparatus according to Embodiment 2 of the present invention.

FIG. 14 is a block diagram showing the configuration of an object detection apparatus according to Embodiment 2 of the present invention. Configuration parts in object detection apparatus 300 shown in FIG. 14 that are common to object detection apparatus 100 shown in FIG. 4 are assigned the same reference codes as in FIG. 4, and detailed descriptions thereof are omitted here.

In Embodiment 2, the procedure for mutual association of characteristic information and an identifier differs from that in Embodiment 1. The internal configuration of association section 306 of object detection apparatus 300 shown in FIG. 14 differs from that of association section 106 of object detection apparatus 100 shown in FIG. 4.

Association section 306 has association determination section 351, close characteristic information adding section 352, and similarity calculation section 153, and finds an identifier that is associated with specified characteristic information.

Association determination section 351 determines whether or not an identifier with which there is a possibility of one or more items of characteristic information that are determination targets being associated in common can be limited to one, and outputs the result of this determination.

Close characteristic information adding section 352 finds characteristic information whose similarity is close for specified characteristic information, and outputs this to association determination section 351.

Next, an actual case will be described in which association section 306 finds an identifier that is associated with specified characteristic information from among characteristic information managed by history management section 105.

Here, it is assumed that history information managed by history management section 105 is similar to that in FIG. 6 given as an example in Embodiment 1, and that association section 306 is requested to find an identifier of characteristic information (100,10).

Figure 15:
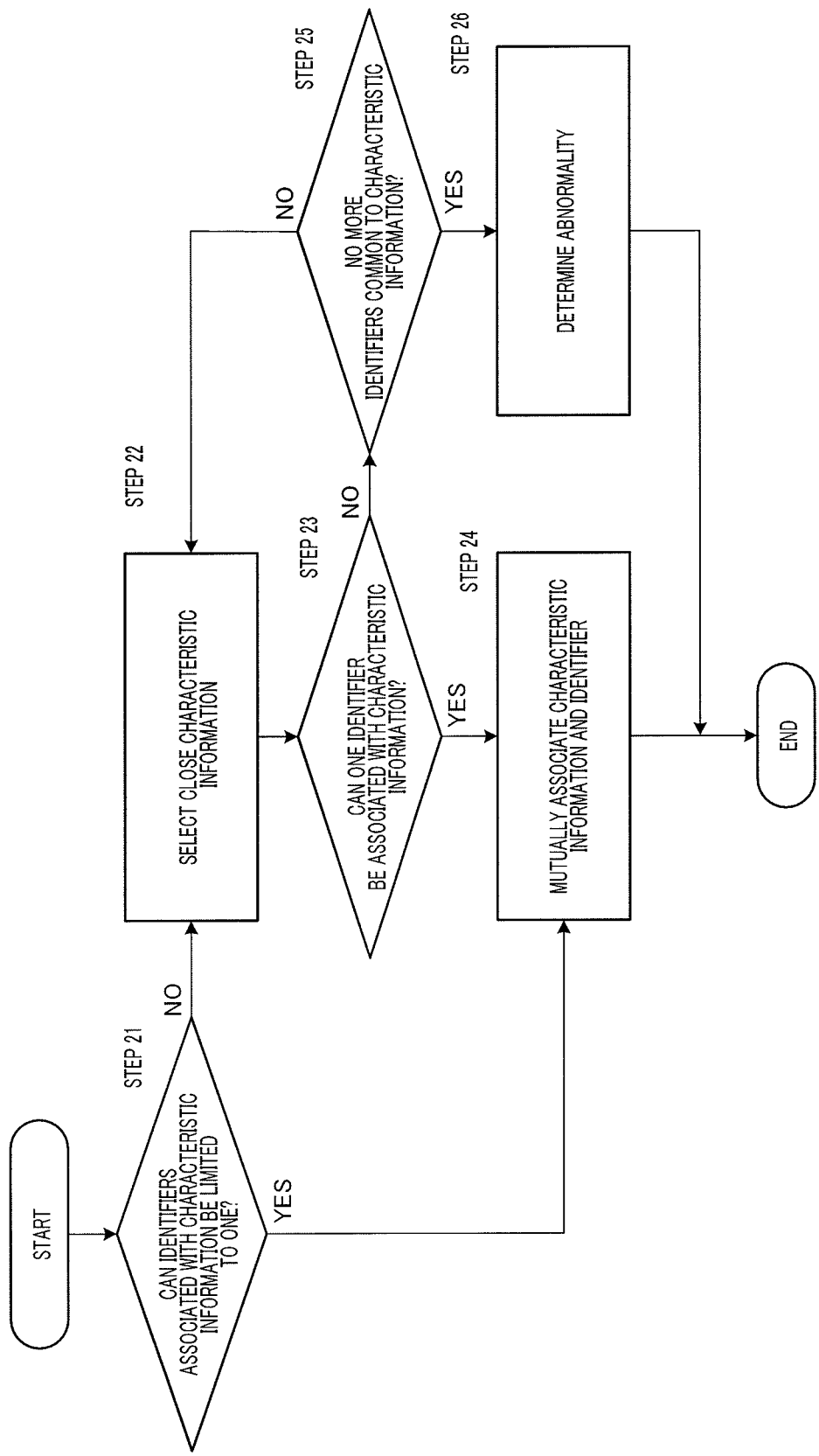
FIG. 15 is a flowchart showing the operating procedure of an association section according to Embodiment 2 of the present invention.

In this case, association section 306 performs mutual association of specified characteristic information (100,10) and an identifier in accordance with the operating procedure shown in FIG. 15. FIG. 15 is a flowchart showing the operating procedure of association section 306 according to this embodiment.

Step 21: Determine Possibility of Association.

Association determination section 351 determines whether or not the number of identifiers with which there is a possibility of characteristic information being associated can be limited to one.

In this example, there are two identifiers—ID11 and ID22—for which there is a possibility of corresponding to characteristic information (100,10), and association determination section 351 cannot limit the number of identifiers to one (step 21: NO).

Step 22: Select Close Characteristic Information.

If the number of identifiers cannot be limited to one in step 21 (step 21: NO), close characteristic information adding section 352 selects close characteristic information based on similarity calculated by similarity calculation section 153.

In this example, close characteristic information adding section 352 selects characteristic information (95,15) closest to characteristic information (100,10).

Step 23: Determine Possibility of Association.

Association determination section 351 adds the characteristic information selected by close characteristic information adding section 352 as a determination target, and determines whether or not the number of identifiers common to all characteristic information that is a determination target can be limited to one.

In this example, identifiers for which there is a possibility of corresponding to characteristic information (95,15) are ID22 and ID33. Thus, an identifier to which there is a possibility of characteristic information (100,10) and characteristic information (95,15) both corresponding is ID22 only, and association determination section 351 can limit the number of identifiers to one (step 23: YES).

Step 24: Mutually Associate Characteristic Information and an Identifier.

If the number of identifiers can be limited to one in step 21 or step 23 (step 21: YES, step 23: YES), association determination section 351 associates a found identifier with specified characteristic information. Furthermore, association determination section 351 outputs information indicating the association result to display section 109.

In this example, association determination section 351 associates ID22 with characteristic information (100,10) and characteristic information (95,15).

Step 25: Perform Abnormality Determination.

If the number of identifiers cannot be limited to one in step 23 (step 23: NO), in step 5 association determination section 351 determines whether or not the number of identifiers common to one or more items of characteristic information is zero.

Then, if the number of common identifiers is not zero, close characteristic information adding section 352 and association determination section 351 repeat the processing in steps 22 and 23 (step 25: NO).

Step 26: Perform Abnormality Occurrence Processing.

If a person who does not have a radio terminal enters the photographic range, or if radio terminals are exchanged, common identifiers may not exist (step 25: YES). In this case, abnormality output section 107 determines that there is an abnormality, and outputs the determination result to display section 109. By this means, an abnormality comprising non-possession or exchanging of a radio terminal can be detected.

Figure 16:
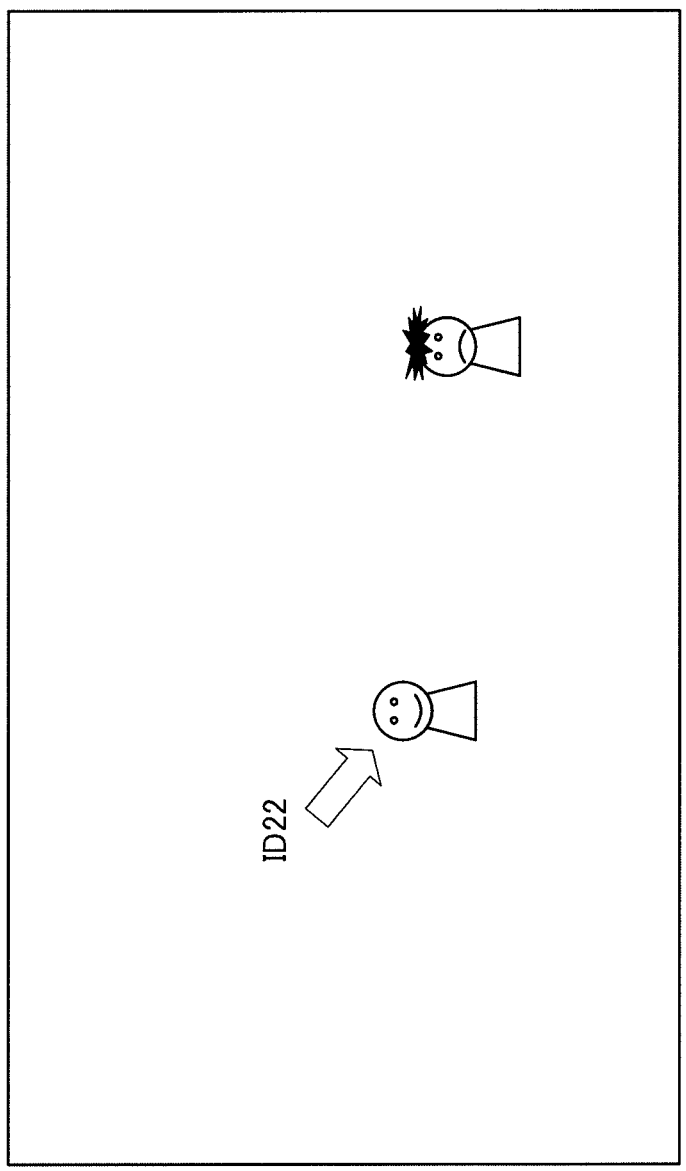
FIG. 16 is a drawing showing an example of a display image according to Embodiment 2 of the present invention.

FIG. 16 is a drawing showing an example of a display image in which an identifier of specified characteristic information is displayed in superimposed fashion. Using results found by association section 306, display section 109 performs display on the periphery of specified characteristic information captured within a photographic image such that an identifier of a radio terminal held by that person is known. In the example in FIG. 16, display section 109 displays "ID22" and an arrow on the periphery of a person area corresponding to characteristic information (100,10).

As described above, according to this embodiment, it is possible to find only an identifier corresponding to specified characteristic information. By this means, the amount of calculation can be reduced compared with the method shown in Embodiment 1 in which characteristic information and identifiers are mutually associated en bloc. The method in Embodiment 1 or Embodiment 2 can be used according to the situation.

With the present invention, the methods of mutually associating characteristic information and identifiers described in Embodiment 1 and Embodiment 2 may also be switched around as convenient.

Embodiment 3

Figure 17:
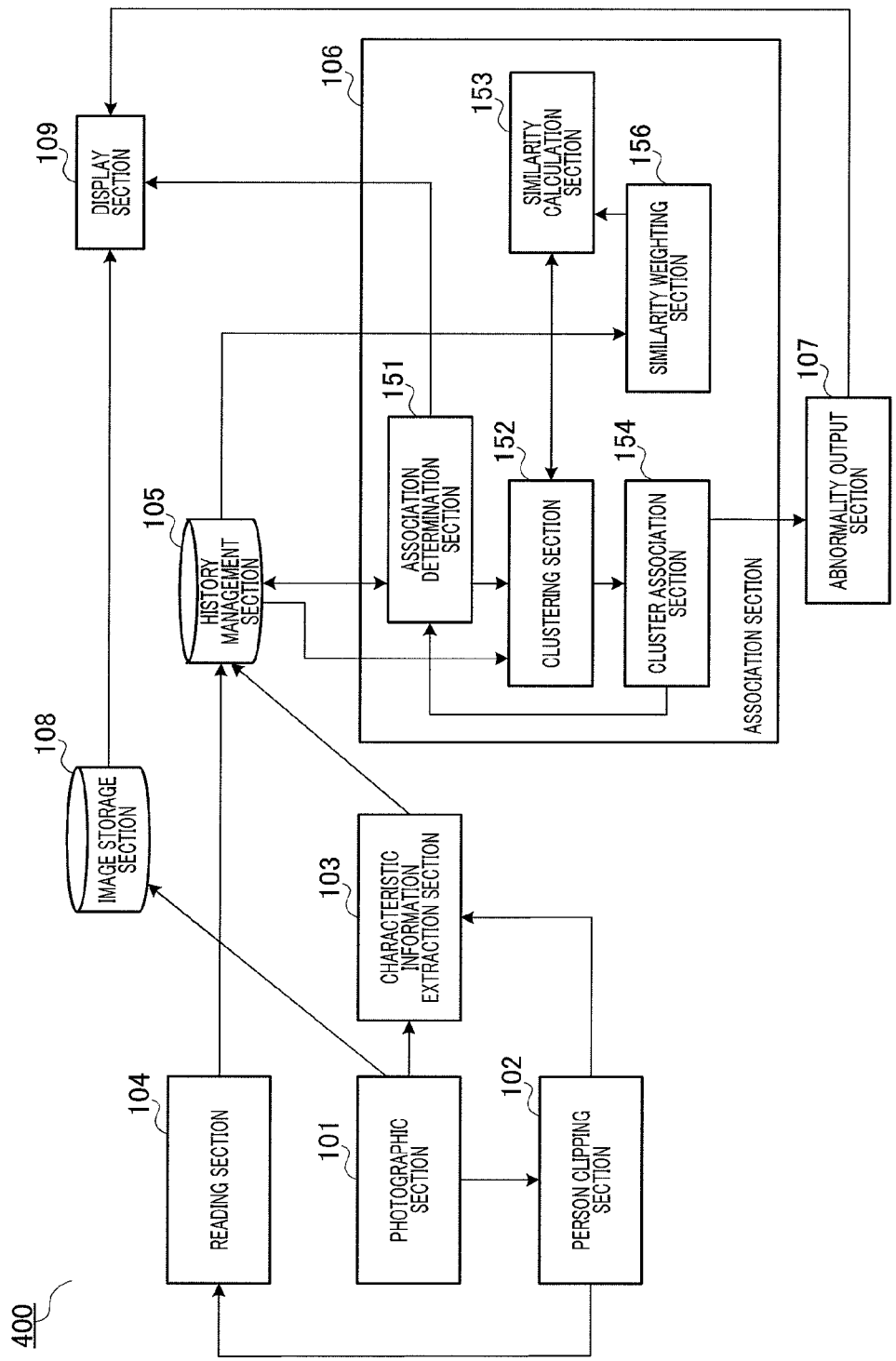
FIG. 17 is a block diagram showing the configuration of an object detection apparatus according to Embodiment 3 of the present invention.
Figure 18:
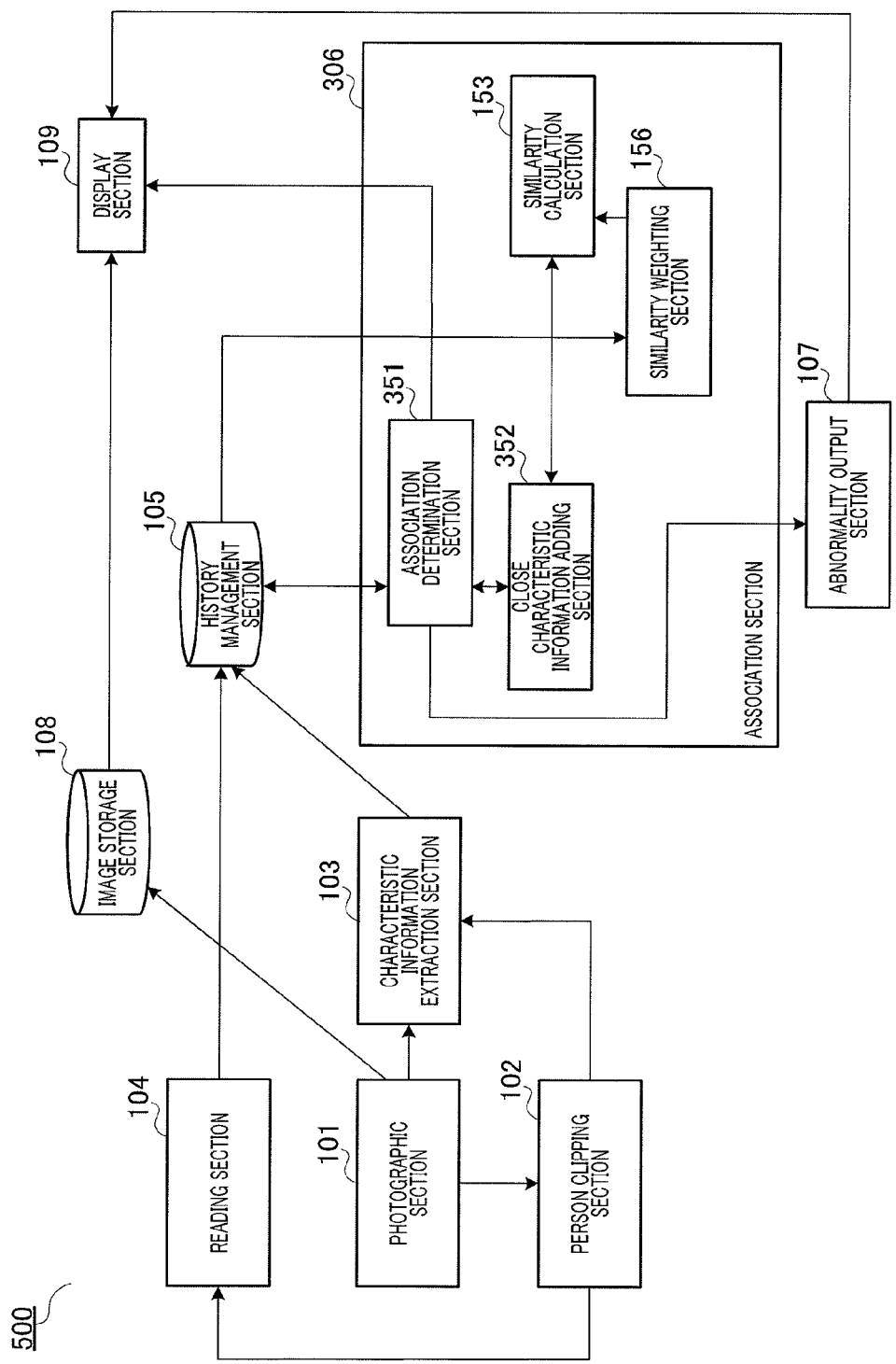
FIG. 18 is a block diagram showing the configuration of an object detection apparatus according to Embodiment 3 of the present invention.

FIG. 17 and FIG. 18 are block diagrams showing configurations of object detection apparatuses according to Embodiment 3 of the present invention, and FIG. 19 is a drawing showing a system configuration including an object detection apparatus according to Embodiment 3 of the present invention. Configuration parts in object detection apparatus 400 shown in FIG. 17 that are common to object detection apparatus 100 shown in FIG. 4 are assigned the same reference codes as in FIG. 4, and detailed descriptions thereof are omitted here. Also, configuration parts in object detection apparatus 500 shown in FIG. 18 that are common to object detection apparatus 300 shown in FIG. 14 are assigned the same reference codes as in FIG. 14, and detailed descriptions thereof are omitted here. FIG. 19 shows a configuration in which one object detection apparatus 400 has a plurality of photographic sections 1001 through 1003, a plurality of reading sections 1011 through 1013, and object detection apparatus 100. Object detection apparatus 100 performs mutual association of characteristic information and identifiers from photographic sections 1001 through 1003 and reading sections 1011 through 1013.

Object detection apparatus 400 shown in FIG. 17 has a configuration in which, in comparison with object detection apparatus 100 shown in FIG. 4, similarity weighting section 156 has been added inside association section 106. Object detection apparatus 500 shown in FIG. 18 has a configuration in which, in comparison with object detection apparatus 300 shown in FIG. 14, similarity weighting section 156 has been added inside association section 306.

Similarity weighting section 156 calculates a weighting coefficient, and outputs this to similarity calculation section 153.

Similarity calculation section 153 corrects an inter-vector distance by multiplying a calculated characteristic information inter-vector distance by a weighting coefficient output from similarity weighting section 156.

An example of a weighting coefficient calculation method used by similarity weighting section 156 is described below.

With images captured in different time periods, photographic conditions differ, including changes in lighting, dress, hairstyle, and so forth. Therefore, even with characteristic information of the same person, characteristic information extracted from photographic images of different time periods may show an increase in an inter-vector distance.

Thus, similarity weighting section 156 calculates a weighting coefficient so that an inter-vector distance decreases the farther apart time periods in which characteristic information that is a target of inter-vector distance calculation is captured are.

By this means, the similarity of characteristic information of the same person extracted from images captured in different time periods can be determined more accurately.

Also, photographic conditions differ, including changes in lighting, for photographic images captured with different cameras. Therefore, even with characteristic information of the same person, characteristic information extracted from photographic images of different cameras may show an increase in an inter-vector distance.

Figure 20:
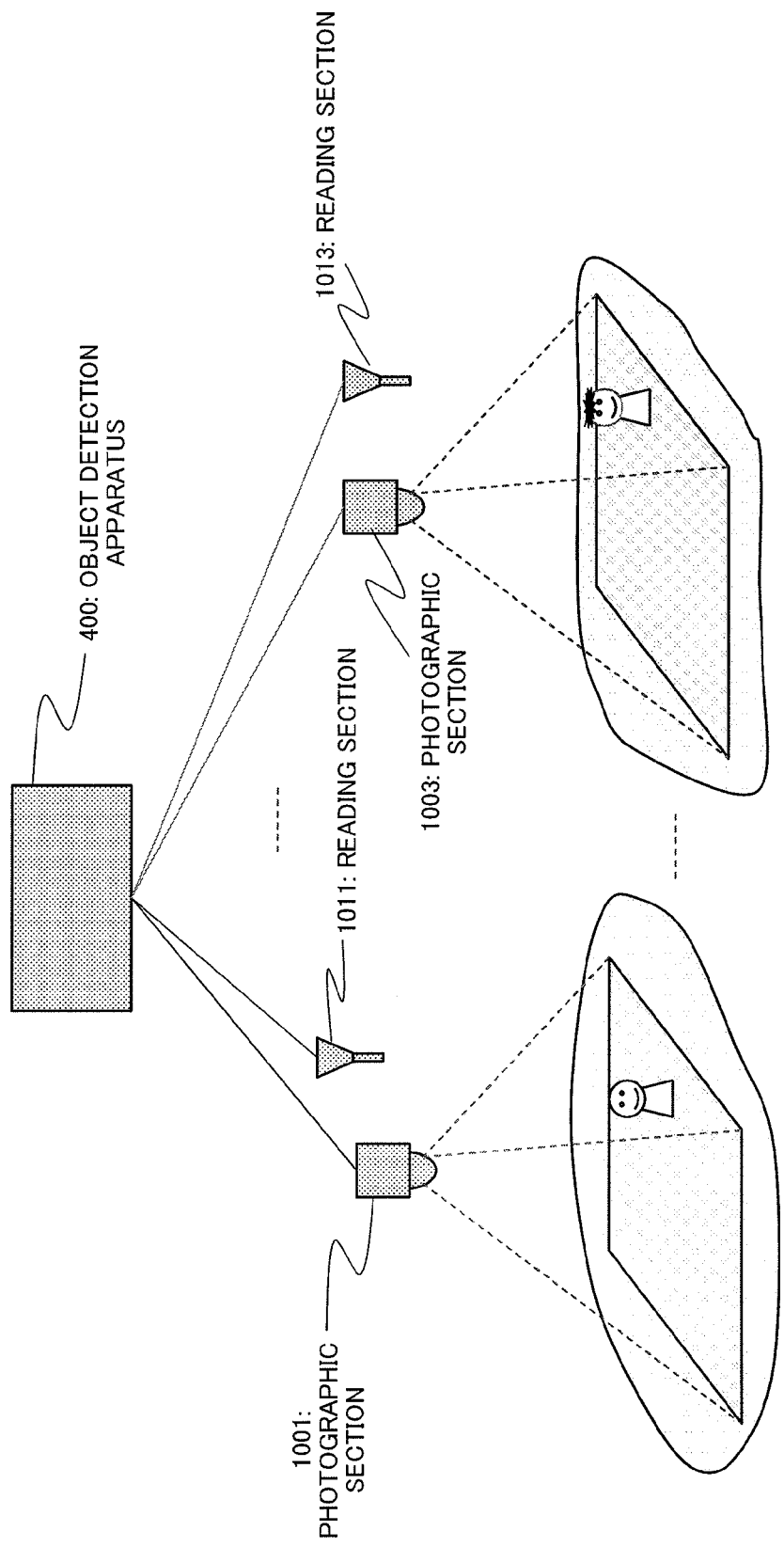
FIG. 20 is a drawing showing an example of history information managed by a history management section according to Embodiment 3 of the present invention.

Thus, similarity weighting section 156 calculates a weighting coefficient based on photographic conditions. Photographic conditions include, for example, a camera ID and white balance information for the time when an image was captured. In this case, characteristic information extraction section 103 acquires a camera ID and white balance information from photographic section 101, and records these in history management section 105 together with characteristic information. An example of a data format managed by history management section 105 including camera IDs and white balance information is shown in FIG. 20.

By this means, the similarity of characteristic information of the same person extracted from images captured by different cameras can be determined more accurately.

Even over a period of several days, a person's appearance may change significantly, and a characteristic information inter-vector distance may increase.

Thus, provision is made for similarity weighting section 156 to be able to make a conjecture using only history information of a fixed time period in which a person's appearance does not change significantly. For this purpose, similarity weighting section 156 sets a weighting coefficient to a maximum value if a difference in times at which characteristic information that is a target of inter-vector distance calculation is captured exceeds a predetermined threshold value.

By this means, it is possible to prevent similarity precision from decreasing due to a significant change in the appearance of the same person.

In the above embodiments, a plurality of pairs of photographic section 101 and reading section 104 that receives a radio wave in a range including the photographic range of that photographic section 101 may also be used. In this case, history management section 105 adds the fact that data is data obtained via photographic section 101 and reading section 104 that photograph and receive the same range as additional information, and manages one or more items of characteristic information and one or more identifiers as history information.

In the above embodiments, cases have been described in which a moving object is a person, but the present invention is not limited to this, and can also be applied to a moving object other than a person.

The present invention can also be applied to a digital camera. In this case, it is possible to identify an ID of a person shown when a photograph is taken by providing a digital camera with object detection apparatus functions used in the above embodiments. By this means, the present invention can increase the added value of a digital camera through combination with an application that automatically sends a taken photograph to an address corresponding to an ID of a person photographed.

The present invention can also be applied to a marketing application used in marketing activities by a supermarket, department store, or the like. An example of the use of a marketing application is the installation in a store of an object detection apparatus that detects a user's ID associated with a movement history of that user.

It is possible for the object detection apparatuses used in the above embodiments to be implemented by means of a general-purpose computer such as a personal computer. In this case, the various kinds of processing, including association section processing, are implemented, for example, by having a CPU read and execute a corresponding software program stored in the computer's memory. The various kinds of processing, including association section processing, may also be implemented by a dedicated device incorporating a corresponding LSI chip.

The disclosure of Japanese Patent Application No. 2008-206111, filed on Aug. 8, 2008, including the specification, drawings and abstract, is incorporated herein by reference in its entirety.

INDUSTRIAL APPLICABILITY

The present invention is suitable for use in an object detection apparatus that mutually associates a moving object such as a person detected within a photographic image and an identifier of a radio terminal.

REFERENCE SIGNS LIST 100, 300, 400, 500 Object detection apparatus
101, 1001, 1003 Photographic section
102 Person clipping section
103 Characteristic information extraction section
104, 1011, 1013 Reading section
105 History management section
106, 306 Association section
107 Abnormality output section
108 Image storage section
109 Display section
151, 351 Association determination section
152 Clustering section
153 Similarity calculation section
154 Cluster association section
155 Number-of-clusters deciding section
156 Similarity weighting section
352 Close characteristic information adding section

The invention claimed is:

1. An object detection apparatus, comprising:
a characteristic information extractor that extracts characteristic information of at least one moving object shown in a photographic image;
a reader that reads an identifier of a radio terminal held by the moving object;
a history manager that stores the characteristic information and the identifier associated on a time-by-time basis; and
an associator that mutually associates the characteristic information and the identifier stored in the history manager based on similarity of the characteristic information and an association between the characteristic information and the identifier,
wherein the associator:
when a number of identifiers corresponding to a subset to which specified characteristic information belongs is one, mutually associates the specified characteristic information and the identifier; and
when a plurality of identifiers exist that are associated with the subset to which the specified characteristic information belongs, extracts characteristic information whose similarity to the specified characteristic information is highest from other characteristic information stored in the history manager, and identifies an identifier corresponding to the specified characteristic information by finding an identifier common to the specified characteristic information and the extracted characteristic information.

2. The object detection apparatus according to claim 1, wherein the associator classifies a plurality of the characteristic information stored in the history manager into subsets based on similarity of the characteristic information, and mutually associates the subset and the identifier based on the association between the characteristic information and the identifier.

3. The object detection apparatus according to claim 2, wherein the associator mutually associates all characteristic information that is a member of the subset and the identifier when the number of identifiers associated with the subset is one.

4. The object detection apparatus according to claim 2, wherein the associator determines that there is an abnormality one of when a subset associated with a plurality of identifiers exists and when a subset that is not associated with even one identifier exists.

5. The object detection apparatus according to claim 2, further comprising:
a number-of-subsets decider that sets a number of different identifiers stored in the history manager as an upper limit of a number of the subsets.

6. The object detection apparatus according to claim 1, wherein the associator determines that there is an abnormality if, when an identifier common to at least one identifier included in the extracted characteristic information is sought, the common identifier does not exist.

7. The object detection apparatus according to claim 1, wherein the associator, when calculating the similarity of the characteristic information, performs weighting of similarity so that the similarity decreases when times at which a moving object corresponding to the characteristic information is captured are farther apart.

8. The object detection apparatus according to claim 1, wherein the associator, when calculating the similarity of the characteristic information, performs weighting of similarity according to a difference in a parameter representing one of a photographic condition and a photographic environment of a photographer that photographs a moving object corresponding to the characteristic information.

9. The object detection apparatus according to claim 1, wherein the associator performs association using only the characteristic information and the identifier of a specific time period among all of the characteristic information and identifiers stored in the history manager.

10. The object detection apparatus according to claim 1, further comprising:
an image condition detector that detects a number of moving objects shown in the photographic image,
wherein the reader performs reading when the image condition detector detects one of an increase and a decrease in moving objects shown in the photographic image.

11. The object detection apparatus according to claim 1, further comprising:
an image condition detector that detects a number of identifiers read by the reader,
wherein the characteristic information extractor performs extraction of characteristic information when the image condition detector detects one of an increase and a decrease in identifiers.

12. The object detection apparatus according to claim 1, further comprising:
a display that displays an identifier corresponding to characteristic information of a moving object photographed within a photographic image by the photographer, superimposed within the photographic image.

13. The object detection apparatus according to claim 1, wherein:
the characteristic information is represented by an n-dimensional vector composed of n component values indicating a characteristic of a moving object within an image; and
the associator calculates the similarity of the characteristic information as a characteristic information inter-vector distance represented as an n-dimensional vector.

14. An object detection method, comprising:
extracting characteristic information of at least one moving object shown in a photographic image;
reading an identifier of a radio terminal held by the moving object;
storing in memory the characteristic information and the identifier associated on a time-by-time basis; and
mutually associating the characteristic information and the identifier stored in the memory based on similarity of the characteristic information stored in the memory and an association between the characteristic information and the identifier,
wherein, when a number of identifiers corresponding to a subset to which specified characteristic information belongs is one, the specified characteristic information and the identifier are mutually associated, and
when a plurality of identifiers exist that are associated with the subset to which the specified characteristic information belongs, characteristic information whose similarity to the specified characteristic information is highest from other characteristic information stored in the memory are extracted, and an identifier corresponding to the specified characteristic information is identified by finding an identifier common to the specified characteristic information and the extracted characteristic information.

\* \* \* \* \*